Sept. 3, 1935.  J. A. STADTFELD  2,013,193
COMPOSITE PIPE CONSTRUCTION
Filed Nov. 3, 1934
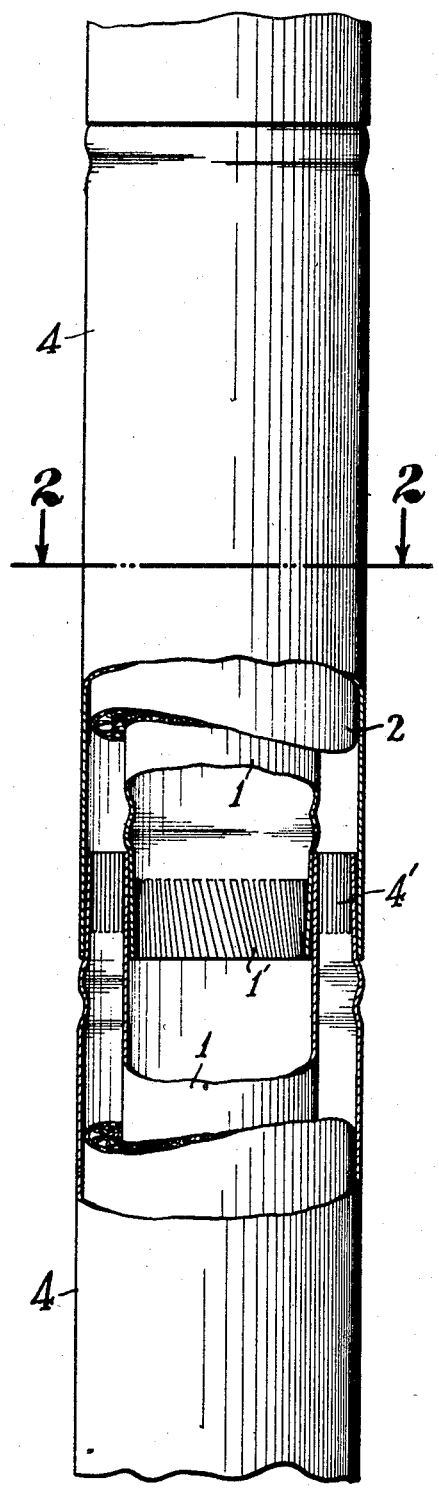
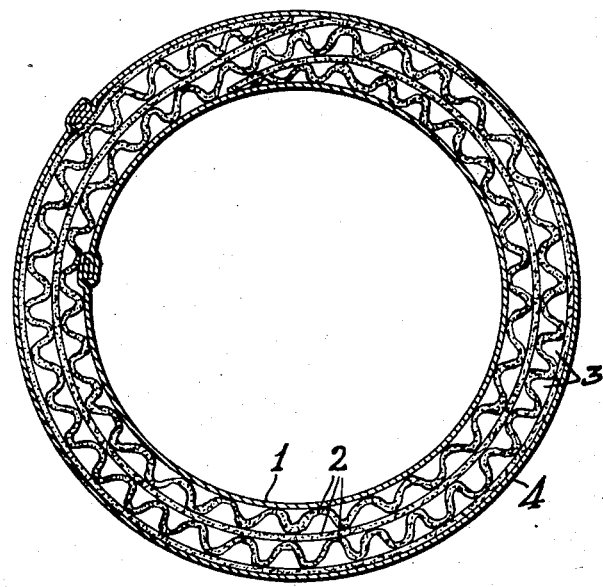
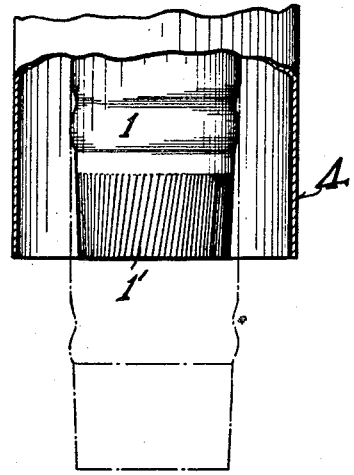
INVENTOR,
Jacob A. Stadtfeld
BY J. E. Trabucco
ATTORNEY Patented Sept. 3, 1935

2,013,19[3]

UNITED STATES PATENT OFFICE 2,013,193

COMPOSITE PIPE CONSTRUCTION

Jacob A. Stadtfeld, San Francisco, Calif., assignor to Williams-Wallace Company, a corporation of California Application November 3, 1934, Serial No. 751,331

3 Claims. (Cl. 137—75)

This invention relates to improvements in composite pipe constructions of the kind used in conveying gases or fluids.

An object of my invention is to provide an improved composite pipe construction consisting of an inner core pipe of non-corrosive material, an outer metallic pipe or casing spaced from the inner core pipe, and an intermediate filler of air cell heat insulating material interposed between the inner and outer pipes.

Another object of my invention is to provide an improved composite pipe construction of the type characterized, the inner core pipe of which is telescopically arranged with respect to the outer pipe and the insulating material.

A further object of my invention is to provide an improved composite pipe construction of the type characterized having end fittings which provide leak proof joints at the joined ends of a number of sections, whereby condensates collecting on the inside surface of the inner pipes are prevented from leaking through their joints to the outside thereof and water running down the outside surface of the outer pipes is prevented from proceeding through their joints to the inside thereof.

Other objects more or less apparent will present themselves or will be specifically pointed out in the description of my invention which is to follow.

In the accompanying drawing:

Fig. 1 is a view partly in vertical longitudinal section and partly in side elevation of a pair of composite pipe sections constructed in accordance with my invention;

Fig. 2 is a section taken on the line 2—2 of Fig. 1; and

Fig. 3 is a side elevation, partly in section, of a part of one of the composite pipe sections, showing by the dotted lines the telescopic arrangement of the inner pipe with respect to the outer pipe.

Referring to the drawing it will be seen that each section of my improved composite pipe, whether it embody the particular form illustrated or some other desired shape, includes an inner "core" tube or pipe 1, made preferably from aluminum or other suitable material which is capable of withstanding the corrosive action of acids which are sometimes carried by fluids or gases of combustion passing therethrough. Around the core tube is positioned a number of windings or layers 2 of heat insulating material which has a plurality of air cells 3 running longitudinally therethrough. The layers 2 are preferably made from corrugated strips of asbestos material which are affixed by an adhesive to a plain sheet of the sam[e] material. The core tube 1 fits loosely within t[he] layers 2 and is capable of being pulled outward as indicated by the dotted lines in Fig. 3. Loca[t]ed around the layers 2 and in contact therewit[h] is an outer pipe 4 which is made from galvaniz[ed] sheet iron or other suitable material.

One end of the outer pipe is crimped as at so as to provide a male fitting, while its opposi[te] end is provided with a female fitting. The pa[r]ticular end of the inner pipe located adjacent t[he] female end of the outer pipe is crimped as at so as to provide a male fitting, while its opposi[te] end is provided with a female fitting. By th[us] forming adjacent ends of the inner and out[er] pipes of each section with male and female f[it]tings, leak proof joints, both inside and out, a[re] provided. With the male end of an inner tube pointing downwardly and fitted inside the fem[ale] end of the adjoining lower section, any conden[s]ates forming inside the said inner pipes are ca[r]ried over the joint in the same manner as a shi[n]gle sheds water. With the male end of an out[er] pipe of a section pointing upwardly and locat[ed] inside the female end of the next higher pipe another section, a joint is provided which she[ds] any exterior moisture running downwardly o[ver] the outer pipes.

In assembling the sections the crimped end of the inner tube of one section is firstly pull[ed] out far enough to facilitate its easy insertion i[n] the female end of the inner tube of an adjoini[ng] section. Thereafter the adjoining ends of t[he] outer pipes of the sections are readily connect[ed] in the usual manner while the joined ends of t[he] inner pipes are maintained in connected relati[on] ship with each other. The telescopic arran[ge]ment of the inner pipe with respect to the lay[ers] 2 of insulating material and the outer pip[e] not only facilitates the joining of the sections gether, but it permits the said inner pipe to easily cut to any desired length. The provis[ion] of air cells 3 in the layers 2 of insulating mate[rial] provides a construction which is not only li[ght] in weight, but one which effectively prevents passing of heat from the inner to the outer pi[pe].

The many advantages of a pipe made in acco[rd]ance with the present invention will no doubt readily understood, and although the prefer[red] embodiments of the invention are as illustra[ted] and described, it is to be understood that mi[nor] changes in the details of construction, and the form and shape of the sections may be m[ade] without departing from the scope of my inv[en]tion as defined by the appended claims.

What I claim is:

1. A composite pipe construction comprising an outer tube, one or more layers of insulating material located around the inside surface of the said tube, and an inner tube slidably located inside the insulating material.

2. A composite pipe construction comprising an outer tube, a layer of insulating material formed into a tube and positioned inside the outer tube with its outside surface in contact with the inner surface of the outer tube, and an inner tube slidably positioned inside the tube of insulating material with its outer surface in contact with the inner surface of the said tube of insulating material.

3. A composite pipe construction comprising an inner core pipe, an external pipe spaced from the inner pipe, and insulating material interposed between the two pipes, the said pipes being telescopically arranged with respect to one another.

JACOB A. STADTFELD.

DISCLAIMER 2,013,193.—*Jacob A. Stadtfeld*, San Francisco, Calif. COMPOSITE PIPE CONSTRUCTION. Patent dated September 3, 1935. Disclaimer filed February 25, 1938, by the assignee, *Williams-Wallace Company*.

Hereby makes disclaimer of any combination of the recited elements in claims 1 and 2, except for "composite" "sectional" pipes for conducting "fluids or gases of combustion" and *except when* "adjacent ends of the inner and outer pipes of each section" have "male and female" ends with the male "end of the inner pipe" "located adjacent the female end of the outer pipe", and "with the male end of an inner tube pointing downwardly and" adapted to be "fitted inside the female end of the adjoining lower section" so that "any condensates forming inside the said inner pipes are carried over the joint", and "with the male end of" the "outer pipe of a section pointing upwardly and" adapted to be "located inside the female end of the next higher pipe of another section", so that "a joint is provided which sheds any exterior moisture running downwardly over the outer pipes", and the completed joints between "adjacent ends" of adjoining sections "of the inner and outer pipes" are in substantial radial alignment, and *except when* each string of connected pipe, outer and inner, is independently supported and "maintained in connected relationship"; and *except when* the "insulating material interposed between the two pipes" provides "an intermediate filler" and "has a plurality of air cells running longitudinally therethrough."

And hereby makes disclaimer of any combination of the recited elements in claim 3, except for "composite" "sectional" pipes for conducting "fluids or gases of combustion" and *except when* "adjacent ends of the inner and outer pipes of each section" have "male and female" ends with the male "end of the inner pipe" "located adjacent the female end of the outer pipe", and "with the male end of an inner tube pointing downwardly and" adapted to be "fitted inside the female end of the adjoining lower section" so that "any condensates forming inside the said inner pipes are carried over the joint", and "with the male end of" the "outer pipe of a section pointing upwardly and" adapted to be "located inside the female end of the next higher pipe of another section", so that "a joint is provided which sheds any exterior moisture running downwardly over the outer pipes", and the completed joints between "adjacent ends" of adjoining sections "of the inner and outer pipes" are in substantial radial alignment, and *except when* each string of connected pipe, outer and inner, is independently supported and "maintained in connected relationship"; and *except when* the "insulating material interposed between the two pipes" provides "an intermediate filler".

[*Official Gazette March 15, 1938.*]